Oct. 2, 1951 L. G. FORSTER 2,570,030
ENDLESS CHAIN CONVEYER
Filed Dec. 8, 1948 5 Sheets-Sheet 1

INVENTOR
Leslie Gordon Forster
BY
Stevens Davis Miller & Mosher
his ATTORNEYS

Oct. 2, 1951 — L. G. FORSTER — 2,570,030
ENDLESS CHAIN CONVEYER
Filed Dec. 8, 1948 — 5 Sheets-Sheet 2

INVENTOR
Leslie Gordon Forster
BY Stevens, Davis, Miller + Mosher
ATTORNEYS

Oct. 2, 1951    L. G. FORSTER    2,570,030
ENDLESS CHAIN CONVEYER
Filed Dec. 8, 1948    5 Sheets-Sheet 4

INVENTOR
Leslie Gordon Forster

BY Stevens, Davis, Miller + Mosher
his ATTORNEYS

Oct. 2, 1951     L. G. FORSTER     2,570,030
ENDLESS CHAIN CONVEYER

Filed Dec. 8, 1948     5 Sheets-Sheet 5

INVENTOR
Leslie Gordon Forster
BY
Stevens, Davis, Miller & Mosher
ATTORNEYS

Patented Oct. 2, 1951

2,570,030

UNITED STATES PATENT OFFICE 2,570,030

ENDLESS CHAIN CONVEYER

Leslie Gordon Forster, London, England

Application December 8, 1948, Serial No. 64,110
In Great Britain December 12, 1947

15 Claims. (Cl. 198—170)

This invention relates to endless chain conveyors with a series of units each of the kind in which units movable with the chains carry fingers or like operating members which are adapted to engage with and move an article forwardly, to stop, to move rearwardly clear of the article and then to be moved onwards by the chains in a path which is clear of the article. In known apparatus of this kind fingers or like operating members have been connected to the chain by pivots located inwardly of the chain, extensions both forwardly and rearwardly of the fingers or like operating members having been provided with pins which cooperate with fixed guides and also formed with slots which cooperate with fixed pins, whereby rotation of the fingers or like operating members is prevented during the straight run and rotational movement in a direction opposite to the direction of rotation of the chain is effected during withdrawal from the operative position at the end of the forward movement. The mechanism employed to carry out such operations is heavy and cumbrous and is, moreover, subject to such acceleration that the inertia forces are high and limit the rate of working. Such apparatus may be used in connection with wrapping machinery for wrapping a succession of packets or packages.

I propose in this kind of apparatus to lead the conveyor chains at the forward end of the apparatus over plain pulleys or chain wheels or sprockets in such a way that, in connection with various improvements in the construction and operation of the units, the fingers will move a series of articles in the manner described with small inertia forces and will give a rapid rate of working.

An embodiment of the invention as intended for use in wrapping machines for packets is shown by way of example in the accompanying drawings.

In the drawings:

Figure 9 is a perspective view of the pin guides.

Figure 1:
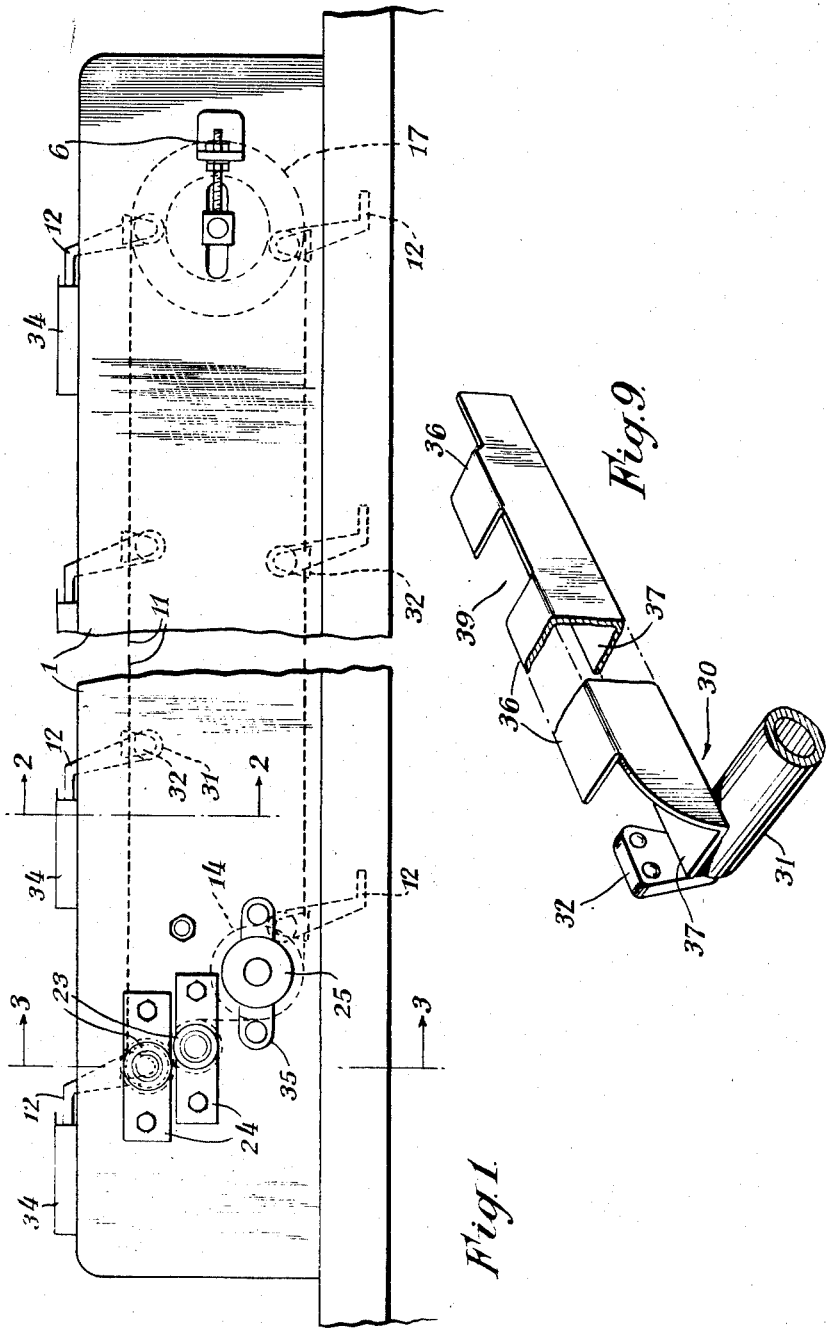
Figure 1 shows a side elevation of the complete machine.
Figure 2:
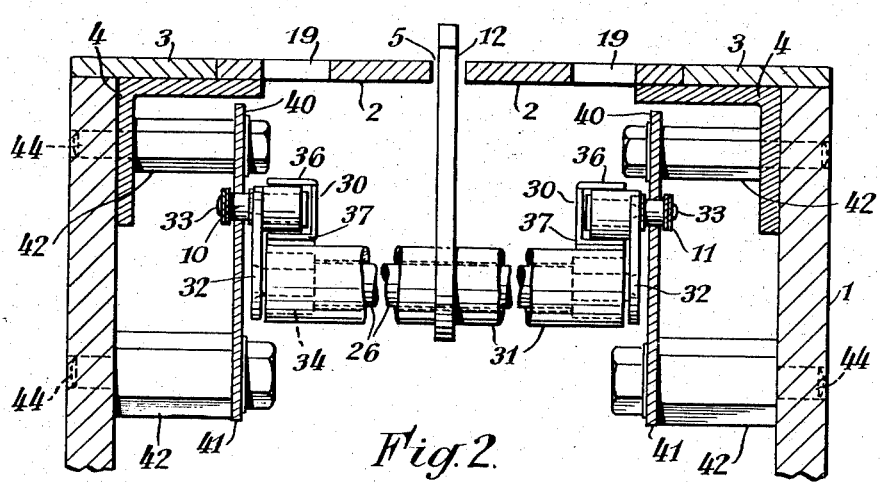
Figure 2 shows a transverse section on the line 2—2 of Figure 1.

The apparatus may conveniently be located within and supported from two vertical plates 1 spaced apart and rigidly connected so as to form the main frame of the machine. Other forms of frame or machine bed may be adopted depending upon the design of other parts of the apparatus. Mounted within the frame are two endless chains 10, 11 working together and carrying round one or more units, each unit including one or more fingers or operating members 12. When two or more units are employed, they are spaced around the chains so as to operate in succession, the number of units and the length of the chain being related to the length of the framework or of the bed of the machine.

The space between the two vertical plates 1 is largely covered in by horizontal plates 2, 3 supported on angles 4. A central opening 5 is provided between the edges of plates 2 to allow movement of finger 12. The packets 34 which are moved forward by the fingers 12 rest upon the upper surfaces of the plates.

Each chain runs over a group of three pulleys, chain wheels or sprockets at the forward or operative end, one of these wheels 14 being preferably a driving chain wheel or sprocket, and the others 15, 16 plain pulleys. The pulleys 15, 16 are each secured to or are integral with spindles 22 which rotate in casings 23 having flanges 24 by which they are bolted to the vertical plates 1. The flanges extend horizontally so as to clear one another. Ball or roller bearings as indicated at 43 may be interposed between spindles 22 and casings 23. Self-lubricating bearings may be used.

Driving sprockets 14 are secured on a transverse driving shaft 18 supported by ball, roller or other bearings in bearing casings 25 mounted by means of their flanges 35 in the vertical plates 1.

The upper run of the chain is substantially horizontal and at the rear end the chain runs over a plain pulley 17 which is preferably of such diameter that the upper and lower runs of the chain are substantially parallel. Chain tensioning means 6 may be provided.

The upper run of each chain passes over about half or 180° of the first pulley 15 and is next led rearwardly in a substantially horizontal direction for a distance which depends upon the amount of rearward movement to be given to the finger 12. The chain then passes over the second pulley 16 and is led downwards underneath the chain sprocket 14 connected to the driving shaft 18. The lower run of the chain passes rearwardly under the large diameter plain pulley 17 at the rear end and then upwardly and forwardly to repeat the cycle. The two driving sprockets 14 are both secured to the driving shaft 18 so that the two conveyor chains 10, 11 move at the same speed.

To ensure that the unit when making its short predetermined rearward movement retraces the forward path of movement, the chain pitch line between the first pulley 15 and the second pulley 16 slopes slightly upwards. This correcting effect is due to the link chain not being exactly equivalent, when led over the pulleys, to a flexible band.

Each of the units includes a unit-supporting member having a spindle or rod 26 connected at each of its ends to one of the chains, and a finger carrier 31 pivoted to the spindle 26 and controlled as regards its angular movement by a leading pin 27 or a following pin 28 on the chain, these pins co-operating with pin guides 30 forming part of or attached to the finger carrier 31, for example by welding.

The unit-supporting member also includes two unit supporting blocks 32 rigidly connected by the transverse supporting spindle or rod 26, each block being secured on the inside of one link in the chain. The block 32 preferably replaces one of the side plates of a chain link and is secured to the chain by the link pins. When roller chains are employed, the pins 33 at the ends of the links selected for this purpose may hold blocks 32 in position, the pins being extended if necessary towards the opposite chain to support the block so that the blocks follow the movement of the links. Each block is offset inwardly of its chain, that is, downwardly when the unit is on the top run of the chain, so that the distance of the centre of the spindle 26 from the pitch line of the chain is equal to the radius of the pitch circle of the chain when it passes over the first pulley 15. Other forms of block or equivalent connection could be used in order that the centre of the spindle 26 would move with but be maintained at a substantially constant distance inwardly from the pitch line of the chain.

The tubular finger carrier 31 is pivotally mounted on the transverse spindle 26 connecting the unit supporting blocks 32 on the two sides of the machine and may consist of a tube having the finger secured thereto, at or near its centre, the finger or operating member 12 extending upwards and then forwards. Carrier 31 is clear of spindle 26 over the greater part of its length and is supported thereon at the ends by bearing members 34.

Two or more transversely spaced fingers may be used. The forward ends of the fingers may be extended transversely or may carry transversely extended plates which engage the end of a packet. The engaging surfaces may be covered with resilient or other non-metallic material.

On the outer ends of the tubular finger carrier 31 are secured, as by welding, offset pin guides 30 which extend rearwardly of the unit and engage the leading pins 27 or the following pins 28. These pins project inwardly from link joints of the chain. Each pin guide consists of two members or bars 36, 37 spaced apart and disposed symmetrically inwardly and outwardly respectively of the pitch line of the chain when the chain is on a straight run. The gap between the bars is sufficient in width to accommodate the pins 27, 28 and allow free movement and the ends are open. At a point along the bar 36 of the pin guide 30, a slot or opening 39 is provided to allow for the re-entry of the leading pin 27 into the guide as will be described hereinafter. The pins may carry rollers to reduce friction.

Each pin guide may consist of a channel section sheet metal member having the open side of the channel facing the chain, the two flanges forming the outer and inner members or bars 36, 37, the slot 39 being provided in the outer flange 36. The inner flange 37 may be welded to the end of the tubular finger carrier 31. Any suitable mechanical equivalent of this sliding pin and guide mechanism may be used.

When the unit is following along the top run of the chain, finger carrier 31 and finger 12 will be held in their correct operative position with the pin guides 30 parallel with the chain by engagement of the leading pin 27 with the guide, pin 27 then being located towards the trailing end of the guide remote from the supporting member or finger carrier 31. The following pin 28 will then be behind the unit and not in engagement with the guide. As an example, the distance between the centre of the unit supporting blocks 32 and the leading pin 27 might be six and a half links of a roller chain, while the interval between the leading pin 27 and the following pin 28 might be seven links.

As the chains 10, 11 move the unit forward, finger 12, at a suitable point, engages the end of the lowermost one 34 of a stack of packets or packages resting on plates 2, 3 and moves it forward. When the conveyor is used in a wrapping machine, the necessary piece of wrapping paper or like thin material is placed in the path of the package and is wrapped round the package by wrapping operations forming no part of the present invention and leaving the rear end open so that the packet may continue to be engaged by the finger 12.

As soon as the centre of the transverse spindle 26 on the supporting member is vertically above the centre of the first pulley 15, forward movement ceases for the reason that the supporting blocks follow the movement of the link to which they are attached as it moves round the centre of the pulley. During this rotation of pulley 15 through about 180°, the centre of spindle 26 coincides with the centre of the pulley. The supporting blocks 32 and the chain links to which they are attached thus also move about the centre of the pulley. During this movement, the leading pin 27 runs out of the leading end of pin guide 30 and the following pin 28 enters the guide at the rear end. The trailing end of the guide is supported before following pin 28 enters by a skid 21 secured to the inner member 27 of the guide, this skid bearing against the upper side of a guiding plate 29 supported from the main frame by a transverse bar 35 connecting the vertical frame plates 1.

The links and attached blocks 32 next move rearwardly in a substantially horizontal direction and the transverse spindle 26 of the supporting member similarly moves horizontally through a distance which is somewhat greater than the distance horizontally between the centre of the first pulley 15 and the centre of the second pulley 16. The finger 12 after moving the packet 34 into the end position thus dwells for an interval, during which first pulley 15 moves through about 180° and is then moved rearwardly for a predetermined distance so that the finger 12 will clear the ends of the wrapping material. The links to which the supporting blocks 32 are attached then move downwardly over the second pulleys 16 and into engagement with the driving chain sprockets 17. The corresponding movement of the transverse rod 26 connecting the supporting blocks 32 results in tilting or rotation of the finger carrier 31 about its pivots, the free or outer end of pin guide 30 being then controlled by the following pin 28. The end of the operating member 12 is thus moved downwards clear of the packet 34 or of its wrapping material. The pin guides 30 reach and pass through a vertical position and the leading pin 27 re-enters the guide through the slot or gap 39 while the follower pin 28 leaves the rear end of the guide. The chains are then led round the driving sprockets 17 and the unit follows along the lower or return run of the chains, the pin guides 30 being inverted with the lateral slots 39 underneath. Plates 2 are slotted at 19 to allow movement of the trailing ends of pin guides 30 when they are rotated.

Figure 4:
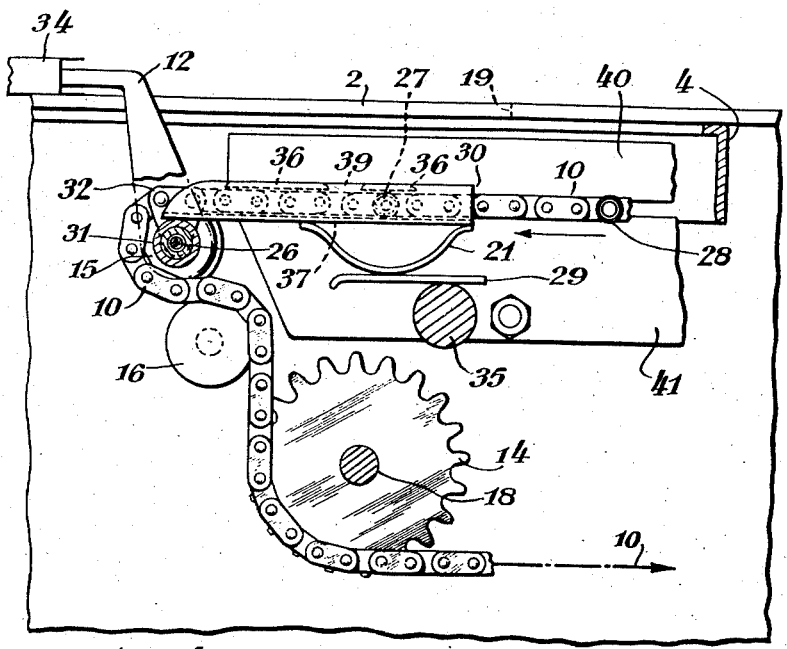
Figures 4, 5, 6 and 7 are longitudinal sections showing the operation of the finger or operating member at the forward end of the conveyor.

In Figure 4, the unit is shown as having just arrived in the extreme forward position, spindle 26 then being concentric with pulley 15.

Figure 5:
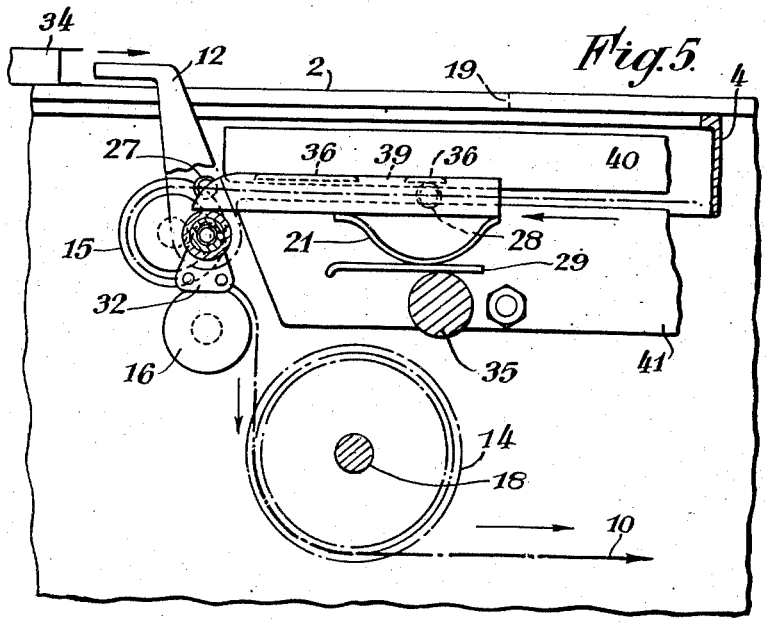

Figure 5 shows spindle 26 at about the end of its rearward movement when it begins to move downwardly as the links to which blocks 32, 33 are secured move round second pulley 16. Finger 12 is then beginning to rotate in an anti-clockwise direction.

Figure 6:
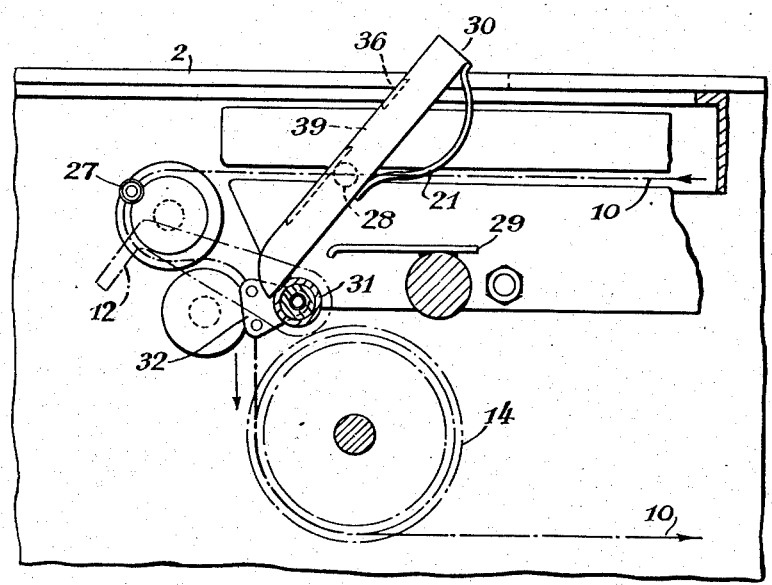

Figure 6 shows pin guide 30 after it has rotated further in an anti-clockwise direction.

Figure 7:
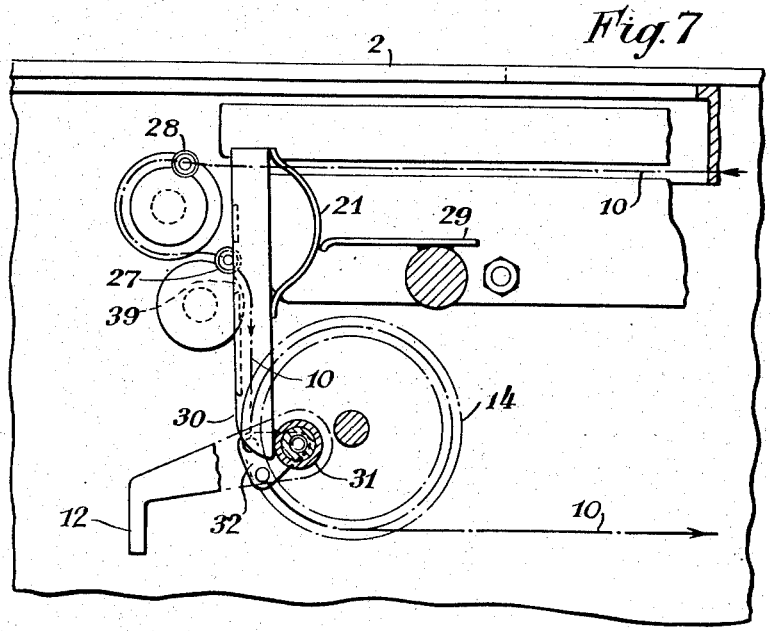

Figure 7 shows the pin guide after it has rotated further past the vertical position, leading pin 27 being then about to re-enter the pin guide through slot 39. Pin 27 then controls the angular movement of finger 12 while it is following the lower run of the chain, the following pin 28 having left the guide.

Figure 8:
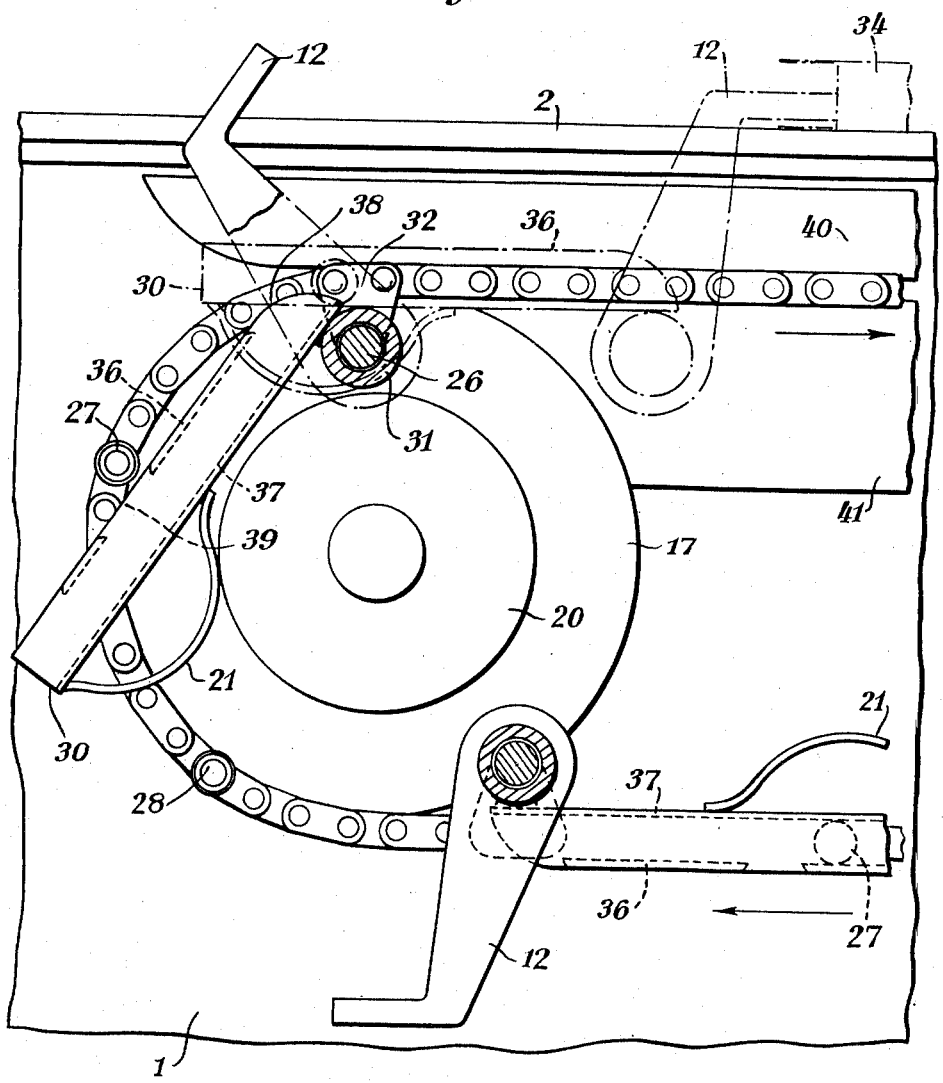
Figure 8 is a fragmentary view of the rear pulley showing a guiding ring.

The unit finally follows under and up the rear side of the plain pulley 17 at the rear end of the conveyor, as shown in Figure 8, after which the cycle of operation is repeated. In this figure, two units suitably spaced follow one another as shown in full lines. An alternative position for one of the units is shown in chain dots. To assist in guiding the pin guides 30 when passing round pulley 17, a concentric ring 20 is secured to the side of the pulley. The skid 21 secured to inner member 27 of the pin guide 30 engages ring 20. While the pin guide 30 is passing round pulley 17, leading pin 27 leaves and then re-enters the guide through slot 39.

Figure 3:
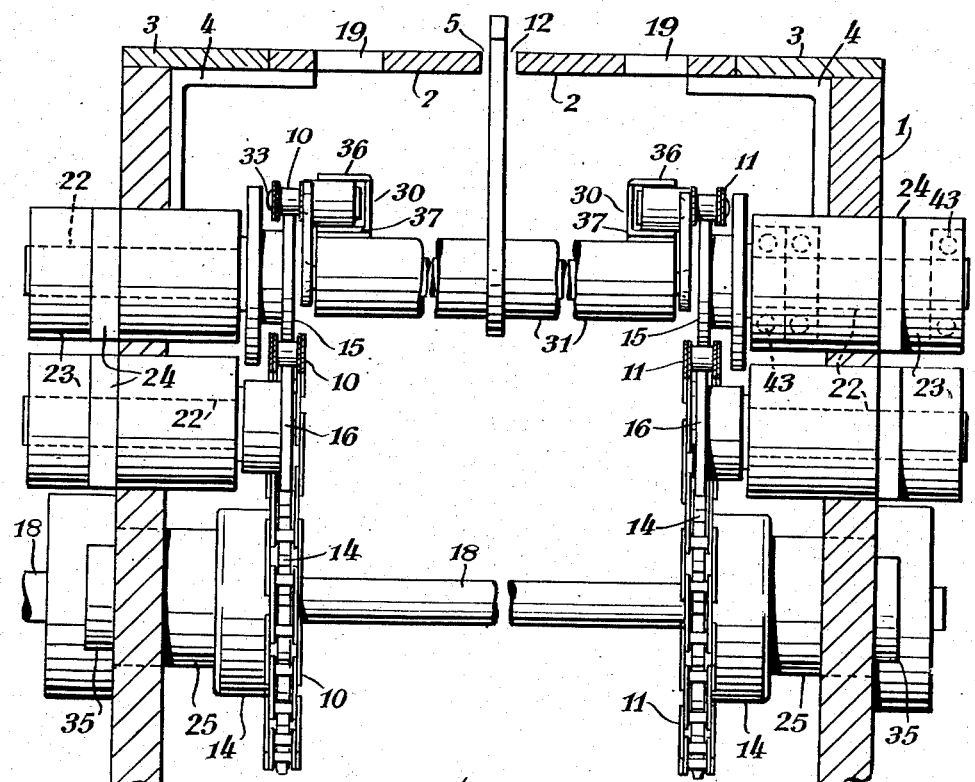
Figure 3 shows a transverse section on the line 3—3 of Figure 1.

The upper run of the chain is guided in a substantially horizontal path between the edges of upper and lower plates or bars 40, 41 secured to or forming part of the main frame. Plates 40, 41 may be secured to frame plates 1 by bolts 44 and distance pieces 42. The upper bolts 44 also assist in holding angles 4 in place. When a roller chain is used, the width of the plates 40, 41 is less than the length of the rollers so that the edges of the plates guide the chain by engagement of the rollers therewith. Lateral play of the chain may also be prevented or limited by the side links of the chain engaging the sides of the plates. This is shown clearly in Figure 3.

The moving parts are light in weight and the follower pin 28 controls and brings about comparatively slow angular movement of the pin guides 30 after the return movement during which the operating member 12 is withdrawn rearwardly, thus avoiding high accelerations and large inertia forces. The apparatus is so designed and constructed that it may be moved reversely without damage.

Although the conveyor has been shown and described as operating in a horizontal direction, it is obvious that it will function if required in an inclined or even in a vertical direction.

What I claim is:

1. Endless chain conveyor comprising an operating member supported on pivots which move with and are maintained at a constant distance inwardly of the chain, a rotatable element having a radius equal to the said constant distance, a guide rigid with and extending rearwardly from the said operating member, the said guide having slidable connection relatively to pins movable with the chain, the chain at its forward end running over said rotatable element and being then guided rearwardly and downwardly, whereby the operating member is moved forwardly, is withdrawn from its forward position and is then rotated in the same direction as the chain so as to move downwardly clear of any article moved forwardly by the following operating member before moving rearwardly with the lower return run of the chain.

2. Endless chain conveyor as claimed in claim 1, in which the guide is formed with upper and lower flanges between which engage pins projecting from the chain.

3. Endless chain conveyor as claimed in claim 2, in which two pins cooperate with the guide, the leading pin leaving the forward end of the guide when the operating member is near the forward position, the guide then being maintained parallel to the chain by the second pin until the operating member is withdrawn rearwardly from its forward position.

4. Endless chain conveyor as claimed in claim 3, in which at the end of the predetermined rearward movement of the operating member, the guides rotate about the second pin, so that the operating member moves downwards and the leading pin re-enters the guide through a cutaway part of one flange, the second pin then leaving the guide at its rear end.

5. Endless chain conveyor as claimed in claim 1, in which the upper runs of the chains run between chain guides to prevent flexing and carry operating member units at spaced intervals suitable for the operations to be performed.

6. Endless chain conveyor comprising an operating member supported on pivots which move with and are maintained at a constant distance inwardly of the chain, a first rotatable element having a radius equal to the said constant distance, a second rotatable element, a driving chain sprocket, a guide rigid with and extending rearwardly from the said operating member, the said guide having slidable connection relatively to pins movable with the chain, whereby rotational movement of the carrier and the operating member is prevented or effected as required, the chain being reversed at its forward end by running it over said first rotatable element and said second rotatable element before it is led downwardly and rearwardly over said chain sprocket, the arrangement being such that the operating member is moved forwardly, is withdrawn from its forward position and is then rotated in the same direction as the chain so as to move downwardly clear of any article moved forwardly by the following operating member before moving rearwardly with the lower return run of the chain.

7. Endless chain conveyor as claimed in claim 6, comprising two parallel endless chains, each chain running over the said rotatable elements and the said driving sprocket, a transverse shaft carrying and driving the driving sprockets, and an idle pulley at the rear end for each chain.

8. Endless chain conveyor as claimed in claim 7, comprising a unit consisting of supporting blocks connected to a link or links of each chain, a transverse supporting member or rod connecting the two blocks, and an operating member carrier pivotally mounted on the said rod, the operating member being secured to the said carrier intermediate the ends thereof, the guides being secured to the said carrier one at each end, and engaging with pins projecting from the sides of the chains.

9. Endless chain conveyor as claimed in claim 8, in which the said guides each comprise an upper and a lower flange between which engage the said pins projecting from the sides of the chains.

10. Endless chain conveyor as claimed in claim 9, in which two pins carried by the chain cooperate with each pin guide, the leading pin leaving the forward end of the guide when the operating member is near the forward position, the guide then being maintained parallel to the chain by the second pin until the operating member is withdrawn rearwardly from its forward position.

11. Endless chain conveyor as claimed in claim 10, in which at the end of the predetermined rearward movement of the operating member, the pivots move downwards over the second rotatable element and the guides rotate about the second pin so that the operating member moves downwards, and the leading pin re-enters the guide through a cut-away part in the upper flange, the second pin leaving the guide at its rear end, after which the first pin controls the angular position of the operating member.

12. Endless chain conveyor as claimed in claim 11, in which the sides of the guides facing towards the interiors of the chains are each provided with a skid which engages a fixed plate near the forward end of the conveyor to assist or supplement the pins in maintaining the guides parallel to the chain before the guides and the operating members are rotated.

13. Endless chain conveyor comprising an operating member supported on pivots which move with and are maintained at a constant distance inwardly of the chain, a rotatable element having a radius equal to the said constant distance, a guide rigid with and extending rearwardly from the said operating member, said guide being formed with parallel flanges, pins movable with the chain, rotation of the operating member about its pivots being controlled by engagement of the guide with the pins, the pins being adapted to leave and re-enter the guide as required, the chain at its forward end running over said rotatable element through an angle of approximately 180° and being then guided downwardly and rearwardly, whereby the operating member is moved forwardly, is withdrawn from its forward position and is then rotated in the same direction as the chain so as to move downwardly clear of any article moved forwardly by the following operating member before moving rearwardly with the lower return run of the chain.

14. Endless chain conveyor as claimed in claim 13, in which two pins movable with the chain cooperate with the guide, the leading pin leaving the forward end of the guide when the operating member is at or near the forward position, the guide then being controlled by the second pin until the first pin re-enters the guide, after which the second pin leaves the guide at its rear end.

15. Endless chain conveyor comprising an endless chain having an upper run and a lower run, pivots which move with and are maintained at a constant distance inwardly of the chain, an operating member supported by the pivots, a first chain reversing rotatable element at the forward end having a radius equal to the said constant distance, a second rotatable element over which the chain runs after leaving the first rotatable element and leading the chain in a return direction away from the upper run, the driving sprocket leading the chain towards the return run, a guide rigid with and extending rearwardly from the said operating member, said guide being formed with parallel flanges, pins movable with the chain, rotation of the operating member about its pivots being controlled by engagement of the guide with the pins, the pins being adapted to leave and re-enter the guide as required, a non-driven rotatable element over which the chain runs at its rear end, and a ring concentric with and secured to one side of the said non-driven rear rotatable element so as to engage the guide, and thus control the rotational movement imparted thereto.

LESLIE GORDON FORSTER.

REFERENCES CITED

The following references are of record in the file of this patent:

UNITED STATES PATENTS

| Number | Name | Date |
|---|---|---|
| 1,096,546 | Lincoln | May 12, 1914 |
| 1,474,619 | Buck | Nov. 20, 1923 |
| 1,971,875 | Pert | Aug. 28, 1934 |
| 2,369,840 | Nalbach et al. | Feb. 20, 1945 |